(12) United States Patent
Oh

(10) Patent No.: US 7,967,271 B2
(45) Date of Patent: *Jun. 28, 2011

(54) VIEWING ANGLE ADJUSTMENT SYSTEM FOR A MONITOR

(75) Inventor: Sung I. Oh, West Covina, CA (US)

(73) Assignee: CLO Systems, LLC

(*) Notice: Subject to any disclaimer, the term of this patent is extended or adjusted under 35 U.S.C. 154(b) by 369 days.

This patent is subject to a terminal disclaimer.

(21) Appl. No.: 11/927,802

(22) Filed: Oct. 30, 2007

(65) Prior Publication Data

US 2008/0114486 A1 May 15, 2008

Related U.S. Application Data

(63) Continuation of application No. 11/028,790, filed on Jan. 3, 2005, now Pat. No. 7,296,774.

(60) Provisional application No. 60/533,923, filed on Jan. 2, 2004.

(51) Int. Cl.
*A47H 1/10* (2006.01)

(52) U.S. Cl. ......... 248/324; 248/919; 361/681; 348/825

(58) Field of Classification Search .................. 348/825, 348/827; 361/681; 248/323, 324, 923, 922, 248/919, 123.11, 123.2, 124.1
See application file for complete search history.

(56) References Cited

U.S. PATENT DOCUMENTS

| | | |
|---|---|---|
| 1,733,107 A | 10/1929 | Ahlberg |
| 4,562,987 A | 1/1986 | Leeds et al. |
| 4,708,312 A | 11/1987 | Rohr |
| 4,720,805 A | 1/1988 | Vye |
| 4,783,036 A | 11/1988 | Vossoughi |
| 5,054,725 A | 10/1991 | Bucefari et al. |
| 5,124,805 A | 6/1992 | Chung et al. |
| 5,139,223 A | 8/1992 | Sedighzadeh |
| 5,474,376 A | 12/1995 | Saunders |
| 5,553,820 A | 9/1996 | Karten et al. |
| 5,842,672 A | 12/1998 | Sweere et al. |
| 5,992,809 A | 11/1999 | Sweere et al. |
| 6,007,038 A | 12/1999 | Han |
| 6,484,993 B2 | 11/2002 | Huffman |
| 6,484,994 B2 | 11/2002 | Hokugoh |
| 6,633,276 B1 | 10/2003 | Jaynes |
| 6,633,286 B1 * | 10/2003 | Do et al. ...................... 345/205 |
| 6,655,645 B1 | 12/2003 | Lu et al. |

(Continued)

FOREIGN PATENT DOCUMENTS

CH 653 464 A5 12/1985

(Continued)

*Primary Examiner* — A. Joseph Wujciak, III

(57) ABSTRACT

This invention provides a support arm to couple a monitor to a surface such as a wall or ceiling to remotely adjust the viewing angle of the monitor. The support arm includes at least one motor along a pivot axis in the support arm. The motor may be activated by a processor based on the control signal provided by the remote control. The support arm may include a plurality of pivot axes with a motor in each of the pivot axis to adjust the viewing angle along the vertical and horizontal planes. The support arm may be also provided with a tracking device that follows the movement of the viewer to adjust the viewing angle of the monitor corresponding to the movement of the viewer. The support arm may also receive periodic signal from the remote control to determine the location of the remote control. Based on the periodic signal, the processor may adjust the viewing angle of the monitor towards the location of the remote control.

33 Claims, 7 Drawing Sheets

U.S. PATENT DOCUMENTS

| | | |
|---|---|---|
| 6,715,269 B2 | 4/2004 | Nanlawala et al. |
| 6,752,363 B2 | 6/2004 | Boele |
| 6,758,454 B2 | 7/2004 | Smed |
| 7,114,688 B2 | 10/2006 | Rudolf |
| 7,124,989 B1 | 10/2006 | Lee et al. |
| 7,185,866 B2 * | 3/2007 | Lee et al. .................. 248/328 |
| 7,296,774 B2 * | 11/2007 | Oh .............................. 248/324 |
| 2004/0031894 A1 | 2/2004 | Smed |
| 2004/0155167 A1 | 8/2004 | Carter |
| 2004/0262474 A1 | 12/2004 | Boks et al. |
| 2005/0110911 A1 | 5/2005 | Childrey |
| 2006/0238661 A1 | 10/2006 | Oh |

FOREIGN PATENT DOCUMENTS

| | | |
|---|---|---|
| GB | 2370171 A | 6/2002 |
| WO | WO 2004/051991 | 6/2004 |

* cited by examiner

VIEWING ANGLE ADJUSTMENT SYSTEM FOR A MONITOR

RELATED APPLICATION

This application is a continuation application of a U.S. non-provisional application Ser. No. 11/028,790, filed Jan. 3, 2005, now U.S. Pat. No. 7,296,774 which claims priority to a U.S. provisional patent application Ser. No. 60/533,923, entitled SYSTEM FOR REMOTELY ADJUSTING THE VIEWING ANGLE OF A MONITOR, filed Jan. 2, 2004. Both applications are hereby incorporated by references.

BACKGROUND OF THE INVENTION

1. Field of the Invention

This invention is directed to a support arm capable of adjusting the viewing angle of a monitor remotely and/or automatically to allow a viewer to watch the monitor more comfortably at the desired viewing angle.

2. General Background

Flat screen monitors such as computer monitors and plasma televisions (collectively referred to as "monitor(s)") are becoming popular because they can be mounted onto a wall to save floor space and for their aesthetically pleasing appearance. In particular, monitors are generally mounted to a wall with a mechanical support arm then fixed in a desired orientation to maximize the viewing angle of the monitor. To later adjust the viewing angle of the monitor, however, a viewer generally tilts the monitor manually to a new viewing angle so that the viewer may more comfortably view the monitor from a different location. For instance, a monitor may be fixed to a wall in a family room to allow the family members or one viewer to view the monitor at the desired viewing angle. As the viewer moves from one area to another area, such as from the family room to the kitchen, the viewer may not be able to view the monitor. In addition, in situations where the monitor is mounted in a remote location or high above the floor, it may be inconvenient for the viewer to adjust the viewing angle of the monitor. As such, there is a need for adjusting the viewing angle of a monitor so that a viewer may view the monitor comfortably from a variety of locations.

INVENTION SUMMARY

This invention provides a support arm to couple a monitor to a surface such as a wall or ceiling to remotely or automatically adjust the viewing angle of the monitor. The support arm includes at least one motor along a pivot axis in the support arm. The motor may be activated by a processor based on the control signal provided by the remote control. The support arm may include a plurality of pivot axes with a motor in each of the pivot axis to adjust the viewing angle along at least one plane such as the vertical and/or horizontal plane. The support arm may be also provided with a tracking device that follows the movement of the viewer to adjust the viewing angle of the monitor corresponding to the movement of the viewer. The support arm may also receive periodic signal from the remote control to determine the location of the remote control. Based on the periodic signal, the processor may adjust the viewing angle of the monitor towards the location of the remote control.

Other systems, methods, features and advantages of the invention will be or will become apparent to one with skill in the art upon examination of the following figures and detailed description. It is intended that all such additional systems, methods, features and advantages be included within the description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DESCRIPTION OF INVENTION

Figure 1:
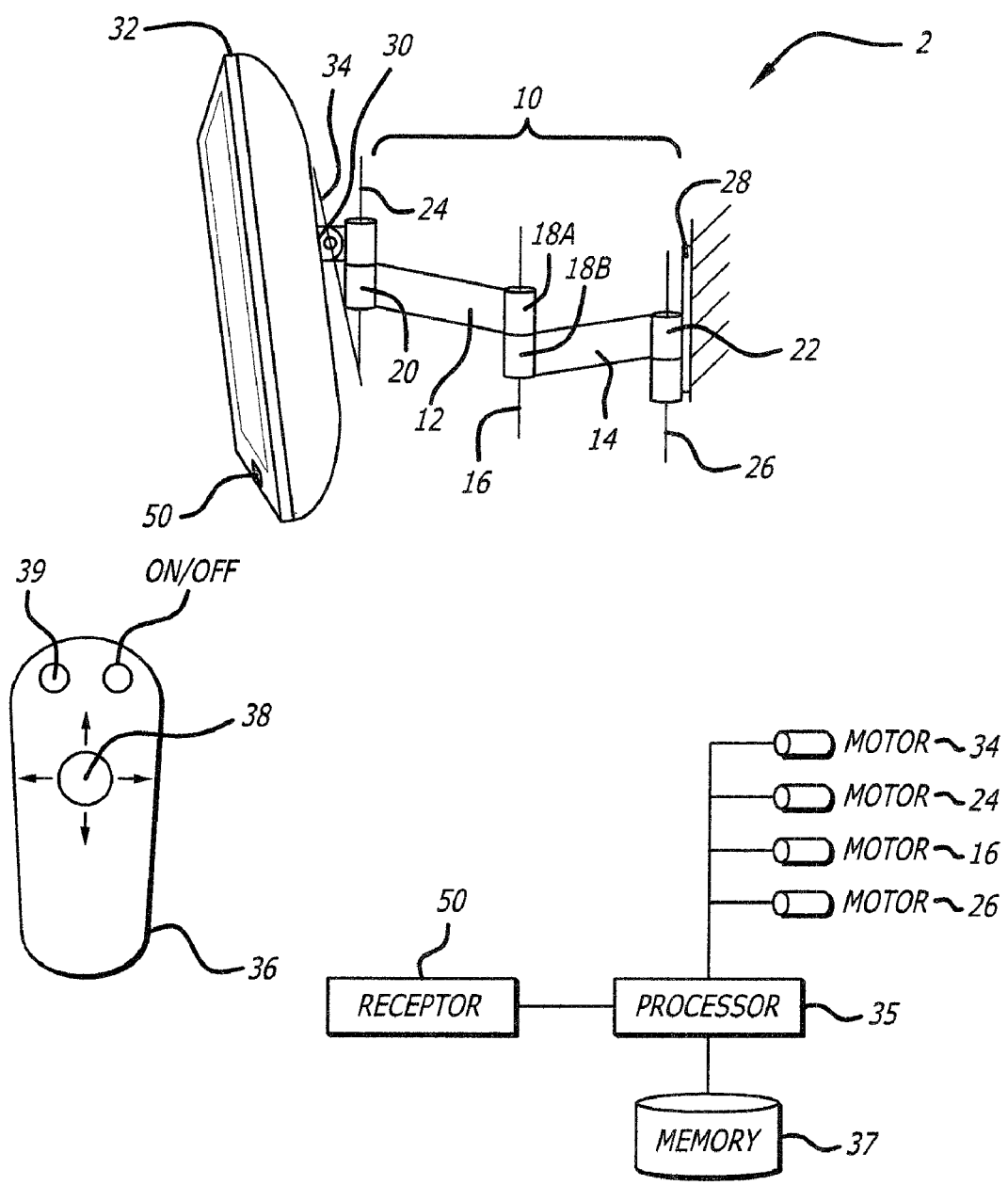
FIG. 1 illustrates a viewing angle adjustment system capable of adjusting the viewing angle of a monitor.

This invention is generally directed to remotely controlling the viewing angle of the monitor that is mounted onto a surface or in a remote area. FIG. 1 shows a viewing angle adjustment system 2 including a support arm 10 having a plurality of arms 12 and 14. The two arms 12 and 14 may be coupled along the pivot axis 16. Along the pivot axis 16, the two arms 12 and 14 may form a housing 18A and 18B, respectively, adapted to house an electric motor. The electric motor may be a servo motor capable of pivoting or rotating the housing 18A relative to the housing 18B, thereby actuating the arm 12 relative to the arm 14. A variety of different types of motors known to one skilled in the art may be used in the pivot axis. In addition, on the opposite end of the housing 18A, the arm 12 may have a housing 20 adapted to pivotally couple an adaptor 30 about the pivot axis 24. Along the pivot axis 24, the adaptor 30 and the housing 20 may enclose another electric motor. Likewise, on the opposing end of the housing 18b, the arm 14 may have a housing 22 adapted to enclose an electric motor capable of pivoting about the pivot axis 26. The housing 22 may be pivotally coupled to a bracket 28 which is adapted to mount onto a surface, such as walls and ceilings. The housing 20 is pivotally coupled to an adaptor 30 which couples the monitor 32 to the support arm 10. In addition, the adaptor 30 may have an electric motor capable of pivoting the monitor 32 along the pivot axis 34. In general, the pivot axes 16, 24, and 26 pivot along the vertical axis and the pivot axis 34 pivots along the horizontal axis.

The viewing angle adjustment system 2 may also include a remote control 36 having a control button 38 capable of remotely controlling the viewing angle of the monitor 32 that is coupled to the support arm 10. In general, a viewing angle may be described as the position of the monitor that it is comfortable for a viewer(s) to watch the monitor. As such, the viewing angle may change from on viewer to another and also change as one or more viewers move around within the viewing area relative to the location of the monitor. The viewing angle may be also described as a line that is perpendicular to the plane of the monitor about its center point. In this regard, the remote control 36 may have a processor 35 that is capable of activating the motors along the pivot axes 16, 24, 26, and 34. The remote control 36 may be used to control the rotation of the motors along their respective pivot axes to adjust the viewing angle of the monitor 32. The control signal from the remote control 36 may be provided by a viewer or though other input data as discussed below. A receptor 50 may be provided on the monitor or on the support arm 10 to receive the control signal from the remote control 36.

Based on the input data from a viewer, the processor 35 provide a control signal to each of the motors that needs to rotate to orient the monitor 32 at a desired viewing angle. The processor 35 may calculate the rotation of each of the motors, if any, so that the monitor 32 may be moved from an initial viewing position to a new desired viewing position with minimal delay or through least amount of movements by the arms 12 and 14. Besides the remote control 35, the processor 35 may also be provided within the support arm 10 such as in the bracket 28, for example. If the processor 35 is located within the remote control 36, the input data from a viewer may be processed by the processor 35 to send a control signal to the receptor 50 to efficiently rotate each of the motors in the support arm 10 to orient the monitor 32 to the desired viewing angle. The receptor 50 may receive the control signal from the remote control 36 and forward the control signal to the motors within the support arm to adjust the viewing angle of the monitor accordingly. If the processor 35 is located on the support arm 10, then the remote control 36 may send the input data from the viewer to the receptor 50, which is then processed by the processor 35 to efficiently rotate the motors accordingly. This way, a viewer may adjust the viewing angle of the monitor remotely by using the control button 38 on the remote control 36. For instance, a viewer may activate the control button 38 either to the left position or to the right position to pivot the viewing angel of the monitor 32 to the clockwise or counter clockwise direction, respectively, when viewed from the top.

Figure 2:
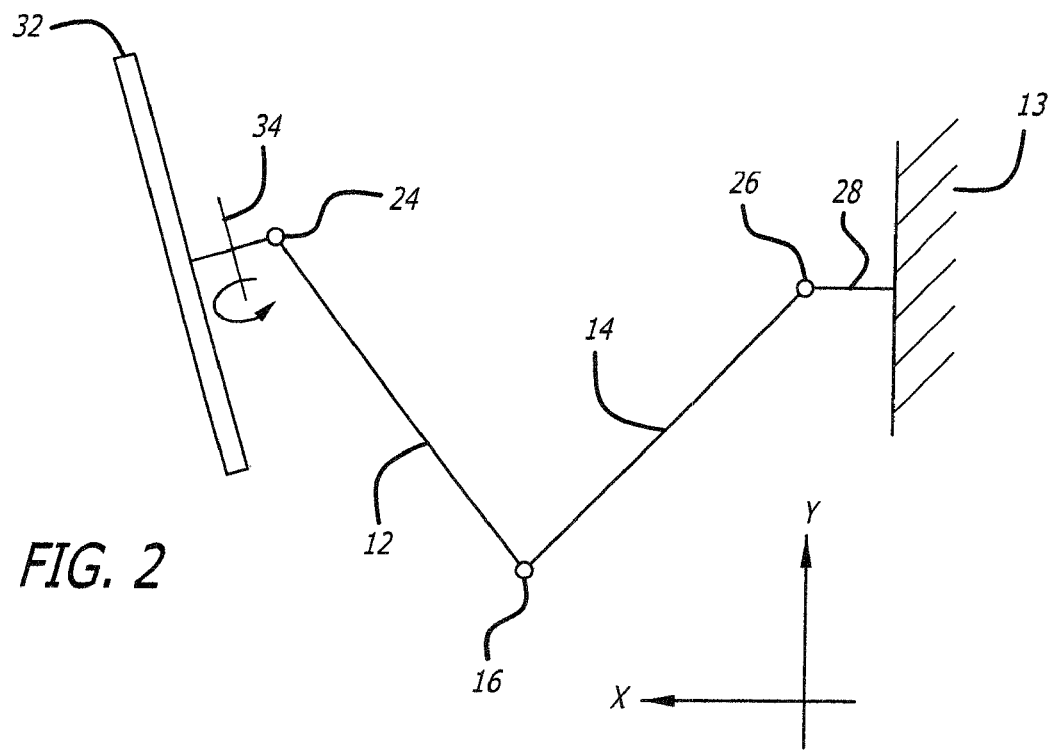
FIG. 2 illustrates a top view of the support arm in one position coupling a monitor to a wall.

FIG. 2 illustrates a top view of the support arm 10 coupling the monitor 32 to a wall 13. The monitor 32 may be pivoted about the horizontal plan in a variety of ways. For instance, the monitor 32 may be pivoted along one of the pivot axis 16, 24 or 26 to pivot the monitor either in the clockwise or counter clockwise direction. Alternatively, a combination of motors along the pivot axes 16, 24, and 26 may be activated to adjust the viewing angle of the monitor to a desired direction. The motor along the pivot axis 24 may be activated to pivot the monitor 32 either in the clockwise or counter clockwise direction along the pivot axis 24. The motor along the pivot axis 16 may be activated to pivot the monitor 32 along an arc about the pivot axis 16 with the length of the arm 12 being the radius of the arc. Likewise, the motor along the pivot axis 26 may be activated to pivot the monitor 32 along an arc about the pivot axis 26 with the straight distance between the pivot axes 24 and 26 being the radius of the arc. With a variety of ways to reposition the monitor to the desired viewing angle, the processor 35 may calculate the rotation of each of the motors, if any, so that the monitor 32 may be moved from an initial viewing position to a new desired viewing position with minimal delay or through least amount of movements by the arms 12 and 14.

Figure 3:
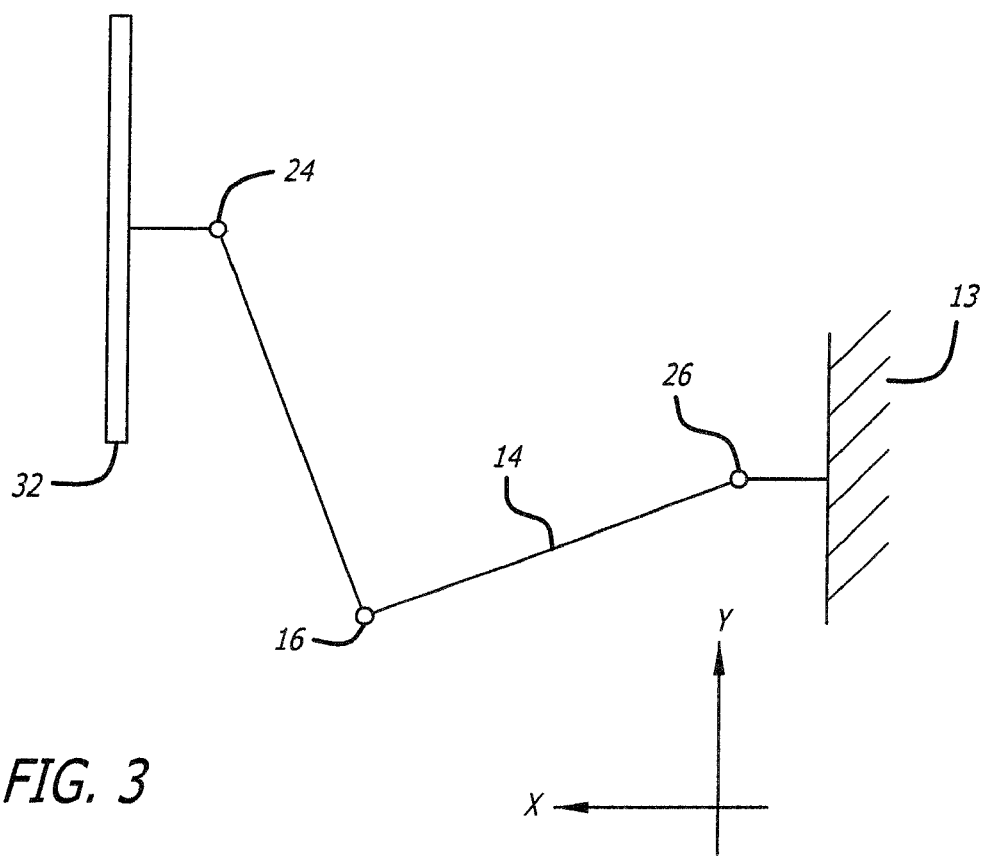
FIG. 3 illustrates a top view of the support arm in a different position than in FIG. 2.

A memory 37 may be provided with the processor 35 to store the desired movement of the monitor 32 along the horizontal plan desired by the viewer. That is, the remote control 36 may be provided with a teach function 39 that allows the viewer to input the desired movement of the monitor 32 along the horizontal plan to the processor 35 which is then stored to the memory 37. For instance, FIG. 2 illustrates a first position of the monitor 32 to define the position of the monitor 32 along an X and Y plane; and FIG. 3 illustrates a second position of the monitor 32 along the X and Y plane. A viewer may desire the viewing angle of the monitor 32 to follow the movement from the first position to the second position. In this example, a viewer may initiate the teach function 39 from the first position, then move the monitor 32 to the second position so that the processor 35 may store in the memory 37 the desired X and Y coordinates of the arc movement of the monitor through the X and Y plane. In this instance, the motor along the pivot axis 26 may be activated to rotate the arm 14 in a clockwise direction to move the monitor 32 along the arc movement that follows from the first position to the second position.

The desired first position and the second position may vary depending on the viewer but each viewer may teach the desired arc movement to the processor 35. This may involve activating one or more motors in the axes 16, 24, and 26. The desired movement of the monitor 32 may be provided so that the support arm 10 and the monitor 32 may avoid an impeding object that is near the monitor such as a book shelf, column, lamp, or an adjacent wall. Once the desired arc movement of the monitor is stored into the memory 37, the processor 35 may follow the desired arc movement when the viewer activates the control button to the right or left position. In addition, the teach function 39 may be also used to define certain boundaries so that the movement of the monitor is limited to a certain area. This may be done to prevent the monitor from running into adjacent walls, for example. Accordingly, a viewer may adjust the viewing angle of the monitor to the left along the X and Y plane by pressing on the control button 38 to the left which causes the monitor 32 to move to the left, and if the desired arc movement has been programmed into the memory 37, then the movement of the monitor 32 may follow the stored arc movement. Once the monitor is at the desired viewing angle along the X and Y plane, the viewer may depress the control button 38 to stop of the movement of the monitor 32.

Figure 4:
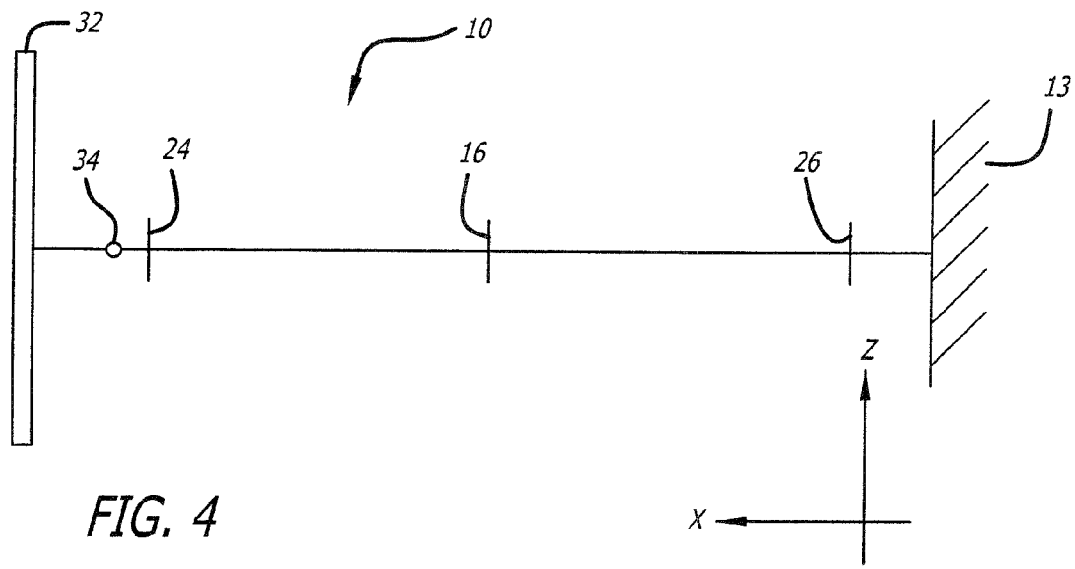
FIG. 4 illustrates a side view of the support arm coupling a monitor to a wall.
Figure 5:
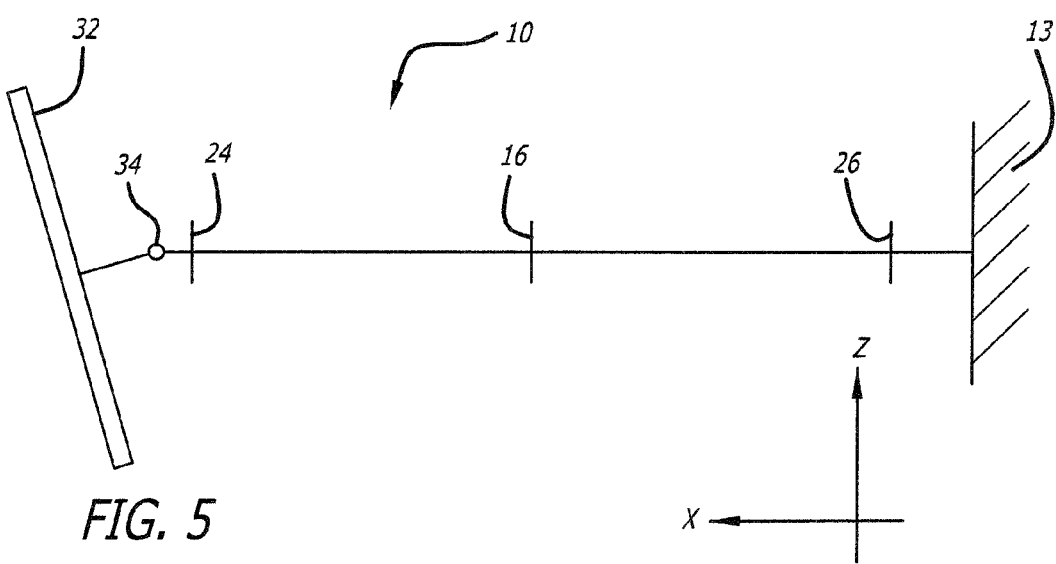
FIG. 5 illustrates a side view of the support arm coupling the monitor of FIG. 4 is a counter-clockwise pivot position in comparison to FIG. 4.

Once the monitor 32 is adjusted for the desired viewing angle along the X and Y plane, the viewing angle of the monitor 32 may be also adjusted along the vertical plane or X and Z plane. FIGS. 4 and 5 illustrate the side view of the monitor 32 along the support arm 10. FIG. 4 illustrate the monitor 32 in the first position along the X and Z plane; and FIG. 5 illustrates the monitor 32 in the second position along the X and Z plane, where the viewing angle of the monitor 32 is in counter clockwise position relative to the first position. To pivot the monitor 32 in the X and Z plane, the viewer may move the control button 38 either to the upward position or downward position to activate the motor along the pivot axis 34 to pivot the monitor 32 corresponding to the clockwise or counter clockwise direction along the vertical or X and Z plane. This way, a viewer may use the control button 38 to adjust the viewing angle of the monitor 32 along the X and Y plane and the X and Z plane.

Figure 6:
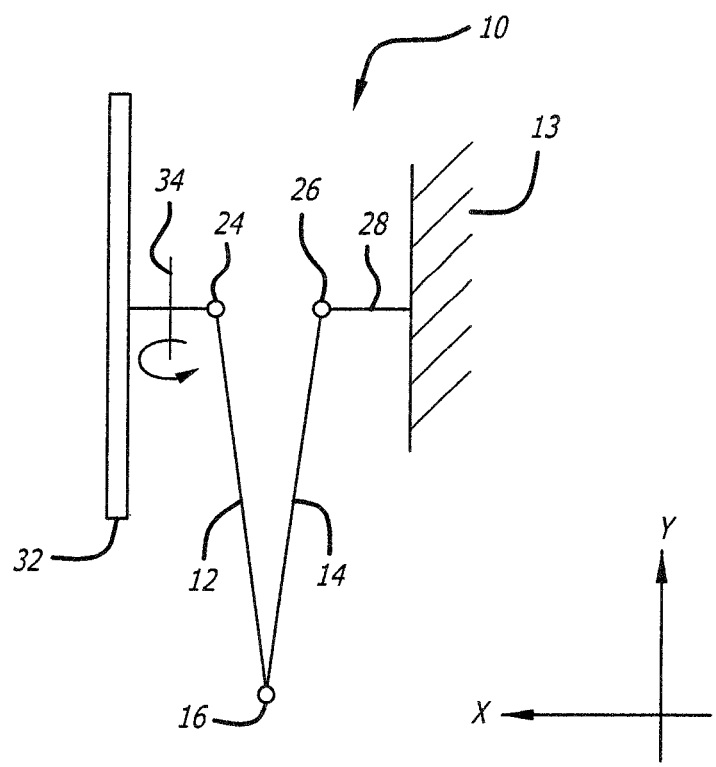
FIG. 6 illustrates a top view of the support arm in a retracted position.
Figure 7:
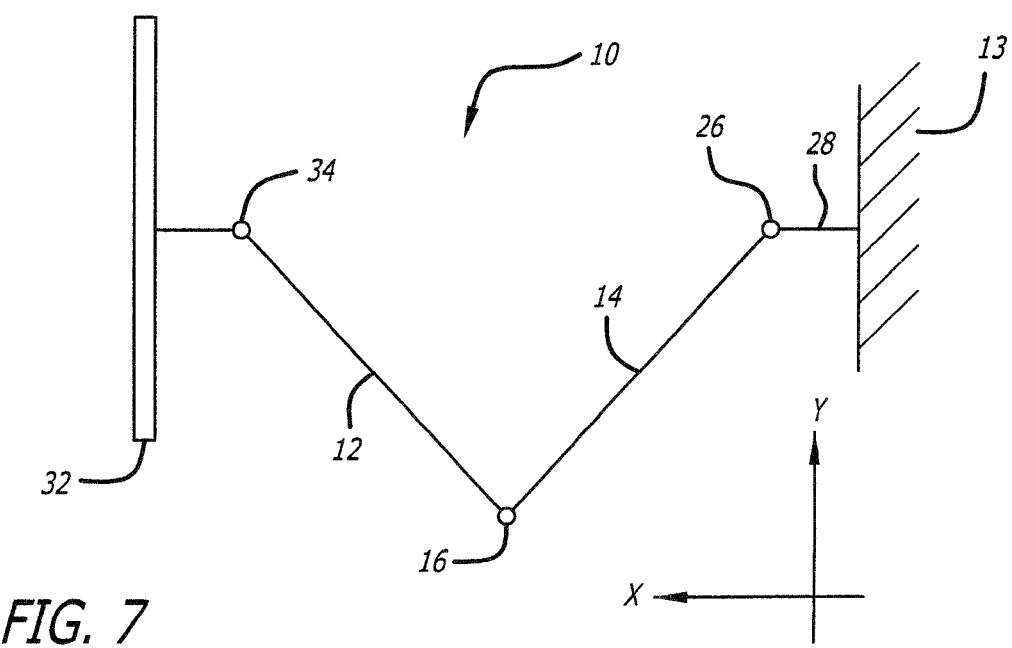
FIG. 7 illustrates a top view of the support arm in an expanded position.

FIGS. 6 and 7 illustrate a top view of the support arm 10, where FIG. 6 shows the support arm 10 in a retracted position; and FIG. 7 shows the support arm 10 in the expanded position. If the viewer desires to extend the monitor away from the bracket 28 or the wall 13, the viewer may hold down the control button 38 and move the control button upwards to send the control signal to the processor 35 to activate the motors in the pivot axes 16, 24, and 26 to extend the monitor 32 from the retracted position to the expanded position. On the other end, if the viewer desires to retract the support arm 10, then the viewer may hold down the control button 38 and moves the control button 38 downward which activates the motors along the pivot axes 16, 24, and 26 to move the monitor 32 towards the bracket 28. Note that for convenience, when the monitor 32 is turned off or when not being used, the support arm 10 may retract the monitor 32 so that it is flush to a wall. The next time the monitor is turned on, however, the processor may extend the support arm 10 to the previous position before the monitor was turned off.

Figure 8:
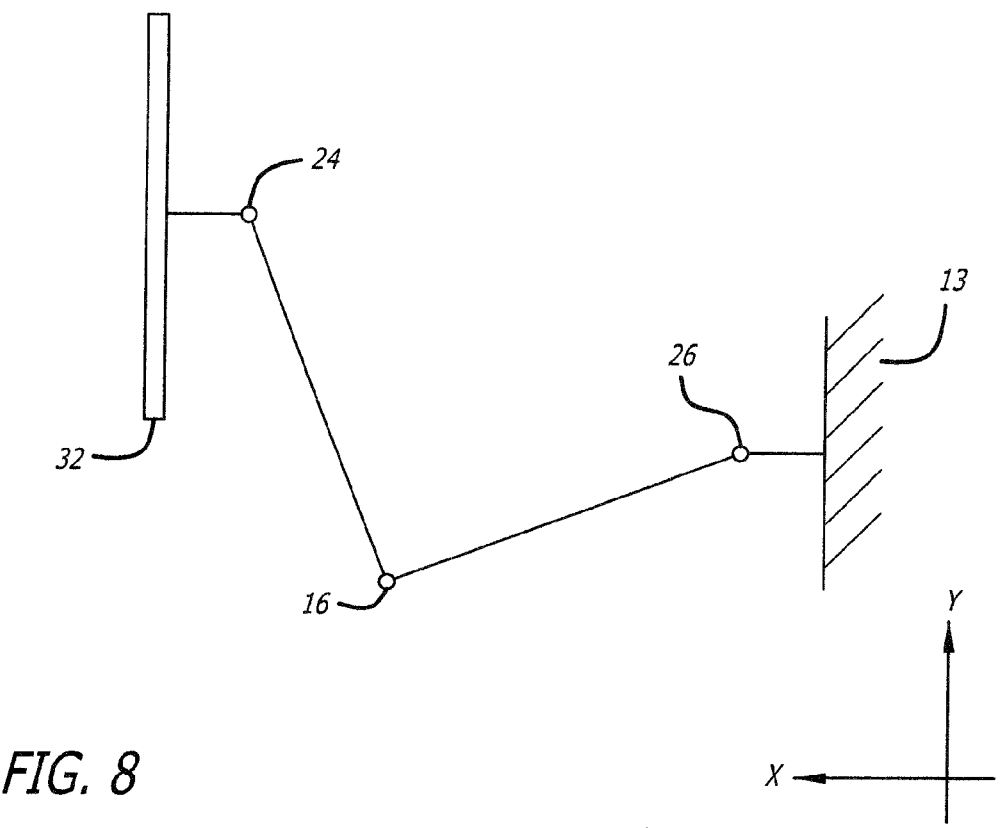
FIG. 8 illustrates a top view of the support arm coupling a monitor with another viewing angle.
Figure 9:
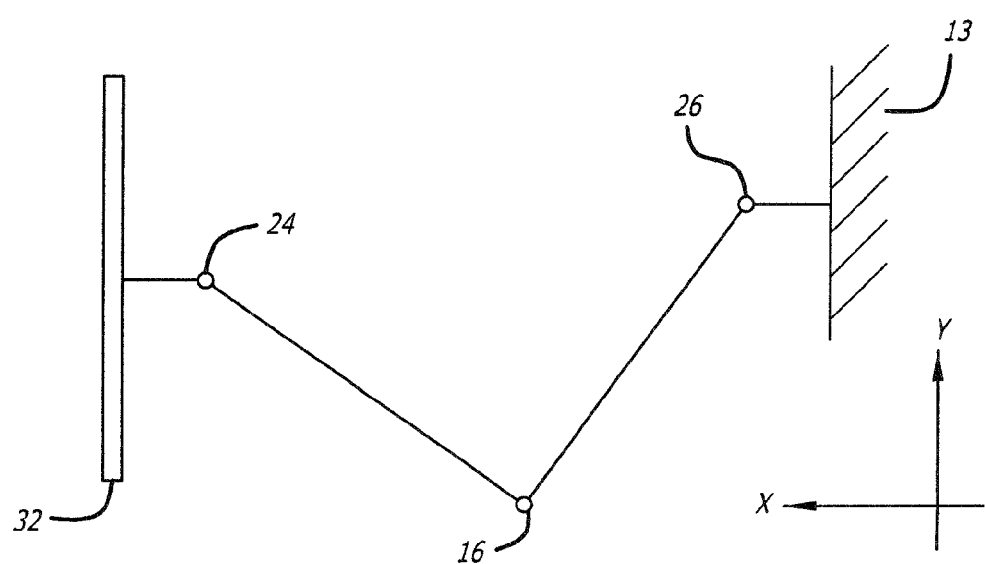
FIG. 9 illustrates a top view of the support arm coupling the monitor in a lateral position in comparison to the lateral position of the monitor in FIG. 8.

FIGS. 8 and 9 illustrate moving the monitor 32 laterally along the Y axis in an X and Y plane while maintaining a constant X. To move the monitor 32 laterally along the Y axis, a viewer may hold down the control button 38 and move the control button 38 either to the left or to the right to send the corresponding control signal to the processor 35. Based on the lateral control signal, the processor 35 may control the motors along the pivot axes 16, 24, and 26 to move the monitor 32 along the Y axis while maintaining a constant X.

Figure 10:
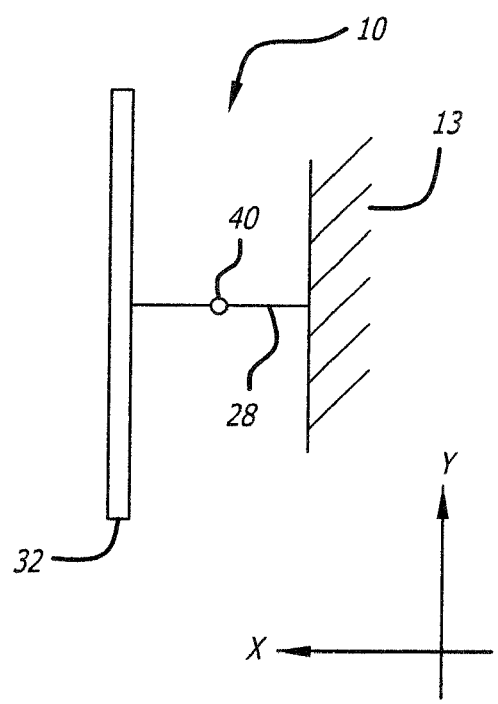
FIG. 10 illustrates a top view of the support arm with a pivot point capable of rotating a monitor along the vertical and horizontal planes.

The number of pivot axes provided with the support arm 10 may vary. For instance, FIG. 10 illustrates the support arm 10 having a bracket 28 with one pivot point 40 that rotates the monitor 32 about the pivot point in a variety of directions. That is, the pivot point 40 may rotate the monitor 32 both in X and Y plane and in the X and Z plane. In addition, the bracket 28 may be telescopic so that the bracket may extend to move the monitor 32 along the X axis. The bracket 28 of the support arm 10 may be also attached to a ceiling or any other surface to mount the monitor to the surface. The support arm 10 may be also provided with pivot axes that pivot along the X and Z plane so that the monitor 32 may be moved up and down along the Z axis.

Figure 11:
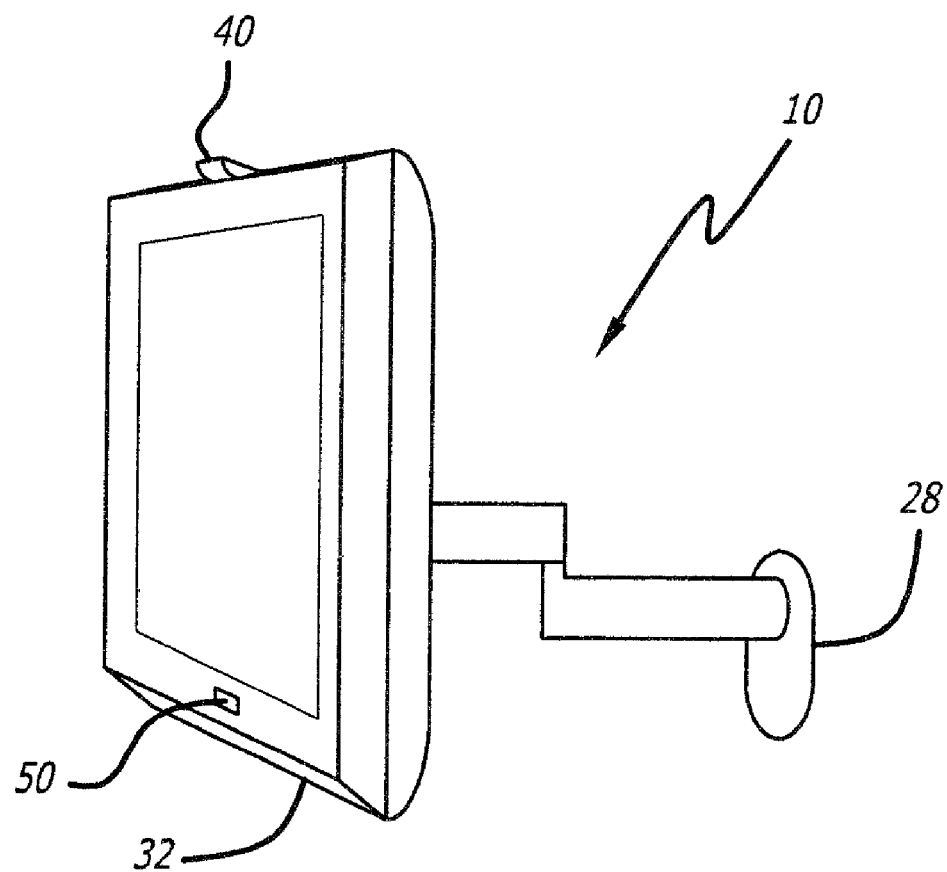
FIG. 11 illustrates a system for adjusting the viewing angle of a monitor based on the movement of the viewer and/or the location of the remote control.
Figure 11:
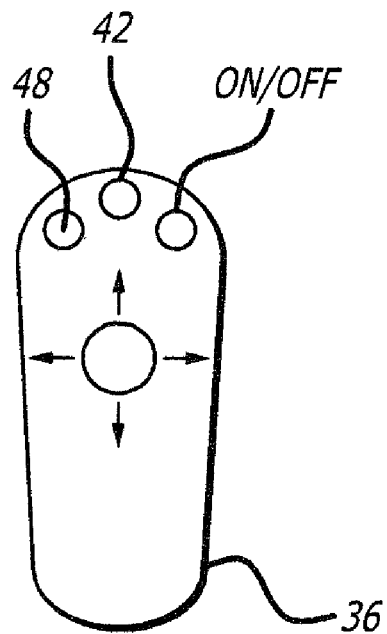

FIG. 11 illustrates that the support arm 10 may be equipped with a tracking device 40 to follow the movement of a viewer. The tracking device may be placed on the outer perimeter of the monitor and communicateably coupled to the processor 35 to adjust the viewing angle of the monitor 32 based on the movement of the viewer. The remote control 36 may be provided with a tracking mode button 42 to activate the tracking mode. Once the tracking mode button 42 is activated, the tracking device 40 may monitor the movement of the viewer and provide movement information to the processor 35. Based on the movement information, the processor 35 may control the motors along the pivot axes so that the viewing angle of the monitor 38 may substantially follow the movement of the viewer. That is, the processor 35 adjusts the viewing angle of the monitor automatically based on the tracking information provided by the tracking device 40 to follow the movement of the viewer so that the viewer may conveniently view the monitor from a variety of locations. The tracking mode 42 may be generally utilized when one viewer is watching the monitor. A variety of tracking device, method, and system known to one skilled in the art may be used to follow the movement of the viewer. For instance, such methods as described in U.S. Pat. No. 5,504,477, entitled Tracking System, and U.S. Pat. No. 6,005,610, entitled Audio-visual object localization and tracking system and method therefore, which are incorporated by reference, may be used to track the movement of the viewer. With regard to U.S. Pat. No. 6,005,610, the visual object detector without the audio detection method may be used as well with this invention. Other methods such as radar triangulation method and heat detection system may be used in this invention to detect the movement of the viewer.

FIG. 11 also illustrates that the remote control 36 may have a follow mode button 48 to adjust the viewing angle of the monitor 32 to automatically follow the location of the remote control 36. Once the follow mode 48 is activated, the remote control 36 may send periodic signals to the receptor 50 to detect the location of the remote control 36. The location of the remote control is then sent to the processor 35 to control the motors along the pivot axes to adjust the viewing angle of the monitor 32. A variety of tracking devices, methods, and systems known to one skilled in the art may be used to follow the movement of the remote control 36. For instance, such methods as described in U.S. Pat. No. 5,504,477 may be used to monitor the movement of the remote control. Other methods such as triangulation and GPS systems may be used to determine the location of the remote control based on the signal provided by the remote control 36. This way, a viewer may place the remote control 36 at a desired location within a viewing area so that the viewing angle of the monitor 36 may be automatically adjusted for the viewer.

The remote control 36 may be provided as a miniaturized transmitter that sends periodic signals to the receptor 50. The transmitter may be attached to a viewer such as on the viewer's collar or shirt so that the viewing angle of the monitor may follow the movement of the viewer. In addition, the transmitter may be attached to the head gear of the viewer or hat so that the viewing angle of the monitor may follow the rotation of the viewer's head. For instance, a surgeon may use an endoscope to visualize the internal organs of a patient during a surgery; a monitor coupled to the endoscope may follow the rotation of the surgeon's head so that the surgeon may conveniently view the monitor. The monitor may also have a variety of sensors to detect nearby objects so that the movement of the monitor may avoid the nearby objects. In such applications, the bracket 28 for the support arm 10 may be coupled to any apparatus or ceiling rather than a wall to support the monitor 32.

Figure 12:
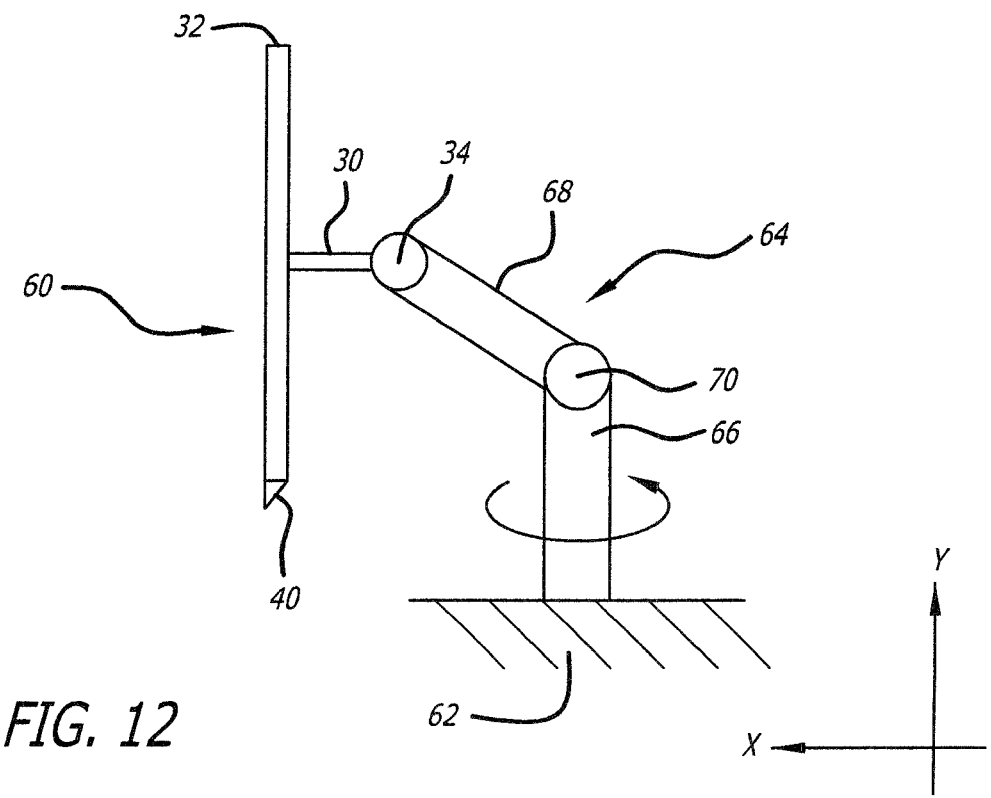
FIG. 12 illustrates a system capable of adjusting the viewing angle of a monitor along a X and Y plane.

This invention may be used in a variety of applications. For instance, FIG. 12 illustrates that the viewing angle of a monitor 32 for a video phone 60 may be adjusted so that the speaker may move around the viewing area while speaking. With the video phone 60, the monitor 32 may be mounted or placed on top of a table 62. As the speaker moves around the viewing area, the monitor 32 or the support arm 64 may be provided with a tracking device 40 to follow the movement of the speaker. This may allow the speaker the freedom to move while speaking at the same time. Alternatively, the tracking device 40 may operate by tracking the voice of the speaker. With the video phones, the monitor may be pivotally coupled to the support arm 64 having a first arm 66 and a second arm 68 coupled to each other along a pivot axis 70 capable of pivoting along the vertical plane or the X and Y plane. The support arm 64 may also include the adapter 30 for coupling the monitor 32 for the video phone 60 to the support arm 64. The adaptor 30 may pivot about the pivot axis 34 as discussed above to rotate the monitor 32 clockwise or counter clockwise direction along the X and Y plane. The first arm 66 may also rotate along the horizontal plane or around the Y axis so that the monitor 32 may rotate around 360 degrees on the table 62 to adjust the viewing angle of the monitor so that the speaker may view the monitor 32. Alternatively, the support arm 10 as described above may be used to adjust the viewing angle of a monitor on top of a table.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A system adapted to adjust a viewing angle of a monitor having a back side, the system comprising:
   (A) a support arm having:
      (1) an adaptor bracket having a first portion and a second portion, the first portion adapted to couple to the back side of the monitor, and the first portion pivotably coupled to the second portion about a first axis,
      (2) a wall bracket adapted to couple to a wall,
      (3) an arm having a proximal end and a distal end, the proximal end pivotably coupled to the wall bracket about a second axis, and the distal end pivotably coupled to the second portion of the adapter bracket about a third axis, the second axis substantially parallel to the third axis, and the first axis perpendicular to the third axis,
      (4) a first motor adapted to pivot the arm about the second axis such that the third axis moves in an arcing manner relative to the second axis,
      (5) a second motor adapted to pivot the adaptor bracket about the third axis, and
      (6) a third motor adapted to pivot the first portion of the adaptor bracket about the first axis; and
   (B) a processor adapted to receive a control signal to adjust the viewing angle of the monitor, and the processor adapted to activate at least one of the first, second, and third motors based on the control signal to adjust the viewing angle of the monitor.

2. The system according to claim 1, including a remote control and a receptor, the remote control adapted to transmit the control signal, the receptor adapted to receive the control signal, and the processor adapted to communicably couple to the receptor to receive the control signal.

3. The system according to claim 1, including a remote control and a memory, the remote control having a teach button, where activation of the teach button causes the remote control to transmit a teach control signal, and based on the teach control signal the processor stores a desired position of the monitor into the memory, and the processor retrieves the desired position from the memory to reposition the monitor to the desired position at a later time.

4. The system according to claim 1, where the processor is adapted to limit the movement of the support arm to prevent the monitor from running into the wall.

5. A system adapted to adjust a viewing angle of a monitor having a front side and a back side, the monitor having a receptor on the front side, the receptor of the monitor adapted to receive a control signal to adjust the viewing angle of the monitor, the system comprising:
   (A) a support arm having:
      (1) an adaptor bracket having a first portion and a second portion, the first portion adapted to couple to the back side of the monitor, and the first portion pivotably coupled to the second portion about a first axis,
      (2) a wall bracket adapted to couple to a wall,
      (3) an arm having a proximal end and a distal end, the proximal end pivotably coupled to the wall bracket about a second axis, and the distal end pivotably coupled to the second portion of the adapter bracket about a third axis, the second axis substantially parallel to the third axis, and the first axis substantially perpendicular to the third axis,
      (4) a first motor adapted to pivot the arm about the second axis,
      (5) a second motor adapted to pivot the adaptor bracket about the third axis, and
      (6) a third motor adapted to pivot the first portion of the adaptor bracket about the first axis; and
   (B) a processor adapted to communicably couple to the receptor of the monitor to receive a first control signal to adjust the viewing angle of the monitor, and the processor adapted to activate at least one of the first, second, and third motors based on the first control signal to adjust the viewing angle of the monitor.

6. The system according to claim 5, including a remote control and a monitor, the remote control adapted to transmit the first control signal to adjust the viewing angle of the monitor, and the monitor having a receptor, the receptor of the monitor adapted to receive the first control signal.

7. The system according to claim 5, including a remote control and a memory, and the remote control includes a teach button, where activation of the teach button causes the remote control to transmit a second control signal, and based on the second control signal the processor stores a desired position of the monitor into the memory, and the processor adapted to retrieve the desired position from the memory to reposition the monitor to the desired position at a later time.

8. The system according to claim 5, including a remote control and a monitor, the remote control adapted to transmit the first control signal to adjust the viewing angle of the monitor and a second control signal to turn off the monitor, the monitor having a receptor, the receptor of the monitor adapted to receive the first control signal and the second control signal, the processor adapted to receive the first control signal and the second control signal from the receptor, and the processor is adapted to activate at least one of the first, second, and third motors to retract the adapter bracket relative to the wall bracket from an extended position to a retracted position based on the second control signal to turn off the monitor.

9. The system according to claim 8, where the remote control is adapted to transmit a third control signal to turn on the monitor, and the processor is adapted to activate at least one of the first, second, and third motors to extend the adapter bracket to the extended position based on the third control signal to turn on the monitor.

10. The system according to claim 5, where the processor is provided with the support arm.

11. The system according to claim 5, where the processor is adapted to limit the movement of the support arm to prevent the monitor from running into the wall.

12. A system adapted to adjust a viewing angle of a monitor having a back side, the system comprising:
   (A) a remote control having at least one control button, where activation of the at least one control button causes the remote control to transmit a viewing control signal to adjust the viewing angle of the monitor;
   (B) a receptor adapted to receive the viewing control signal;
   (C) a support arm having:
      (1) an adaptor bracket having a first portion and a second portion, the first portion adapted to couple to the back side of the monitor,
      (2) a wall bracket adapted to couple to a wall, (3) an arm having a proximal end and a distal end, the proximal end pivotably coupled to the wall bracket about a first axis, and the distal end pivotably coupled to the second portion of the adapter bracket about a second axis, and the first axis substantially parallel to the second axis, and (4) a first motor adapted to pivot the arm about the first axis, and (5) a second motor adapted to pivot the second portion of the adapter bracket about the second axis; and (D) a processor adapted to communicably couple to the receptor, the processor adapted to activate at least one of the first and second motors based on the viewing control signal from the remote control to adjust the viewing angle of the monitor, and the processor adapted to limit the movement of the monitor to prevent the monitor from running into the wall.

13. The system according to claim 12, where the first portion of the adapter bracket is adapted to pivot relative to the second portion of the adapter bracket about a third axis, the third axis substantially perpendicular to the second axis, and further including a third motor adapted to pivot the first portion of the adapter bracket about the third axis, and the processor adapted to activate the third motor to pivot the first portion of the adaptor bracket about the third axis.

14. The system according to claim 12, where the processor is adapted to activate at least one of the first and second motors to retract the adapter bracket relative to the wall bracket from an extended position to a retracted position when the monitor is turned off.

15. The system according to claim 14, where the processor is adapted to activate at least one of the first and second motors to extend the adapter bracket to the extended position when the monitor is turned on again.

16. The system according to claim 12, including a memory, and the remote control includes a teach button, where activation of the teach button causes the remote control to transmit a teach control signal, and based on the teach control signal the processor stores a desired position of the monitor into the memory, and the processor adapted to retrieve the desired position from the memory to reposition the monitor to the desired position at a later time.

17. A system adapted to adjust a viewing angle of a monitor having a back side, the system comprising:
(A) a remote control adapted to transmit a control signal to adjust the viewing angle of the monitor;
(B) a receptor adapted to receive the control signal;
(C) a support arm having:
(1) an adaptor bracket adapted to couple to the back side of the monitor,
(2) a wall bracket adapted to couple to a wall,
(3) an arm having a proximal end and a distal end, the proximal end pivotably coupled to the wall bracket about a first axis, the distal end pivotably coupled to the adapter bracket about a second axis, and the first axis substantially parallel with the second axis, and
(4) a first motor adapted to pivot the arm about the first axis such that the second axis pivots about the first axis in an arcing manner to extend or retract the adaptor bracket relative to the wall bracket; and
(D) a processor adapted to communicably couple to the receptor, the processor adapted to activate the first motor based on the control signal from the remote control to extend or retract the adaptor bracket relative to the wall bracket, and the processor adapted to retract the adaptor bracket relative to the wall bracket when the monitor is turned off.

18. The system according to claim 17, further including a second motor adapted to pivot the adaptor bracket about the second axis, the adaptor bracket having a first portion and a second portion, the first portion of the adapter bracket adapted to pivot relative to the second portion of the adapter bracket about a third axis that is substantially perpendicular to the second axis, and further including a third motor adapted to pivot the first portion of the adapter bracket about the third axis, and the processor adapted to activate the second motor and the third motor to adjust the viewing angle of the monitor based on the control signal.

19. The system according to claim 17, where the processor is adapted to activate the first motor to extend the adapter bracket relative to the wall bracket when the monitor is turned on again.

20. A system adapted to adjust a viewing angle of a monitor having a back side, the system comprising:
(A) a support arm having:
(1) an adaptor bracket adapted to couple to the back side of the monitor,
(2) a wall bracket adapted to couple to a wall,
(3) a first arm having a first proximal end and a first distal end, the first proximal end pivotably coupled to the wall bracket about a first axis,
(4) a second arm having a second proximal end and a second distal end, the first distal end pivotably coupled to the second proximal end about a second axis, the second distal end pivotably coupled to the adapter bracket about a third axis, and the first, second, and the third axes substantially parallel with respect to each other;
(5) a first motor adapted to pivot the first arm about the first axis,
(6) a second motor adapted to pivot the second arm about the second axis, and
(7) a third motor adapted to pivot the adaptor bracket about the third axis; and
(B) a processor adapted to receive a control signal to adjust the viewing angle of the monitor, and the processor adapted to activate at least one of the first, second, and third motors based on the control signal to adjust the viewing angle of the monitor.

21. The system according to claim 20, where the adaptor bracket includes a first portion pivotably coupled to a second portion about a fourth axis, the fourth axis substantially perpendicular to the third axis, and the adaptor bracket having a fourth motor to pivot the first portion of the adapter bracket about the fourth axis.

22. The system according to claim 20, where the processor controls the first, second, and third motors to extend the adaptor bracket relative to the wall bracket in a substantially perpendicular manner.

23. The system according to claim 20, where the processor controls the first, second, and third motors to move the adaptor bracket laterally relative to the wall bracket.

24. A system adapted to adjust a viewing angle of a monitor having a back side, the system comprising:
(A) a remote control adapted to transmit a control signal to adjust the viewing angle of the monitor;
(B) a support arm having:
(1) an adaptor bracket adapted to couple to the back side of the monitor,
(2) a wall bracket adapted to couple to a wall,
(3) an arm having a proximal end and a distal end, the proximal end pivotably coupled to the wall bracket about a first axis, the first axis being a vertical axis when the system is in use, and the adaptor bracket is adapted to couple to the arm, and (4) a first motor adapted to pivot the arm about the first axis such that the distal end pivots about the first axis in an arcing manner along a horizontal plane when the system is in use to extend or retract the adaptor bracket relative to the wall bracket; and (C) a processor adapted to receive the control signal from the remote control and activate the first motor to extend or retract the adaptor bracket relative to the wall bracket, and the processor adapted to retract the adaptor bracket relative to the wall bracket when the monitor is turned off.

25. The system according to claim 24, the support arm including a receptor adapted to receive the control signal from the remote control.

26. The system according to claim 24, where the distal end of the arm is pivotably coupled to the adaptor bracket about a second axis, and the first axis is substantially parallel with the second axis, and further including a second motor adapted to pivot the adaptor bracket about the second axis.

27. The system according to claim 24, where the processor is adapted to activate the first motor to extend the adapter bracket relative to the wall bracket when the monitor is turned on.

28. A system adapted to adjust a viewing angle of a monitor having a back side, the system comprising:
   (A) a remote control having at least one control button, where activation of the at least one control button causes the remote control to transmit a viewing control signal;
   (B) a receptor adapted to receive the viewing control signal;
   (C) a support arm having:
      (1) an adaptor bracket having a first portion and a second portion, the first portion adapted to couple to the back side of the monitor,
      (2) a wall bracket adapted to couple to a wall,
      (3) an arm having a proximal end and a distal end, the proximal end pivotably coupled to the wall bracket about a first axis, and the distal end pivotably coupled to the second portion of the adapter bracket about a second axis, and the first axis substantially parallel to the second axis, and
      (4) a first motor adapted to pivot the arm about the first axis, and
      (5) a second motor adapted to pivot the second portion of the adapter bracket about the second axis; and
   (D) a processor adapted to communicably couple to the receptor, and the processor adapted to activate at least one of the first and second motors based on the viewing control signal from the remote control to move the adaptor bracket relative to the wall bracket.

29. The system according to claim 28, where the first portion of the adapter bracket is adapted to pivot relative to the second portion of the adapter bracket about a third axis, the third axis substantially perpendicular to the second axis, and further including a third motor adapted to pivot the first portion of the adapter bracket about the third axis, and the processor adapted to activate the third motor to pivot the first portion of the adapter bracket about the third axis.

30. The system according to claim 28, where the processor is adapted to activate at least one of the first and second motors to retract the adapter bracket relative to the wall bracket from an extended position to a retracted position when the monitor is turned off.

31. The system according to claim 30, where the processor is adapted to activate at least one of the first and second motors to extend the adapter bracket to the extended position when the monitor is turned on again.

32. The system according to claim 28, including a memory, and the remote control includes a teach button, where activation of the teach button causes the remote control to transmit a teach control signal, and based on the teach control signal the processor stores a desired position of the monitor into the memory, and the processor adapted to retrieve the desired position from the memory to reposition the monitor to the desired position at a later time.

33. A system adapted to adjust a viewing angle of a monitor having a back side, the system comprising:
   (A) a remote control adapted to transmit a control signal to adjust the viewing angle of the monitor;
   (B) a support arm having:
      (1) an adaptor bracket adapted to couple to the back side of the monitor,
      (2) a wall bracket adapted to couple to a wall,
      (3) an arm having a proximal end and a distal end, the proximal end pivotably coupled to the wall bracket about a first axis, the first axis being a vertical axis when the system is in use, and the adaptor bracket is adapted to couple to the arm, and
      (4) a first motor adapted to pivot the arm about the first axis such that the distal end pivots about the first axis in an arcing manner to extend or retract the adaptor bracket relative to the wall bracket; and
   (C) a processor adapted to receive the control signal from the remote control and activate the first motor to move the adaptor bracket relative to the wall bracket.

* * * * *